United States Patent
Steiner et al.

[11] Patent Number: 5,848,376
[45] Date of Patent: Dec. 8, 1998

[54] GPS RECEIVER POWERED BY INTERFACE SIGNALS

[75] Inventors: Glenn C. Steiner, Los Altos; Lloyd H. Banta, Palo Alto, both of Calif.

[73] Assignee: Trimble Navigation Limited, Sunnyvale, Calif.

[21] Appl. No.: 969,191

[22] Filed: Nov. 13, 1997

Related U.S. Application Data

[63] Continuation of Ser. No. 521,400, Aug. 30, 1995, abandoned.

[51] Int. Cl.⁶ ........................................................ G06G 7/78
[52] U.S. Cl. ............................................ 701/213; 342/357
[58] Field of Search ..................... 701/213, 214, 701/215, 216, 200

[56] References Cited

U.S. PATENT DOCUMENTS

| | | | |
|---|---|---|---|
| 4,852,041 | 7/1989 | Nakano | 395/500 |
| 4,884,287 | 11/1989 | Jones et al. | 395/309 |
| 5,271,034 | 12/1993 | Abaunza | 342/357 |
| 5,323,164 | 6/1994 | Endo | 342/357 |
| 5,345,244 | 9/1994 | Gildea et al. | 342/357 |
| 5,408,239 | 4/1995 | Endo | 342/352 |
| 5,523,761 | 6/1996 | Gildea | 342/357 |
| 5,528,248 | 6/1996 | Steiner et al. | 342/357 |
| 5,589,835 | 12/1996 | Gildea et al. | 342/357 |
| 5,592,173 | 1/1997 | Lau et al. | 342/357 |
| 5,629,708 | 5/1997 | Rodal et al. | 342/357 |

*Primary Examiner*—Jacques H. Louis-Jacques
*Attorney, Agent, or Firm*—David R. Gildea

[57] ABSTRACT

A Global Positioning System (GPS) receiving apparatus that is powered by a control or data interface signal from a computing apparatus. The GPS receiving apparatus includes a GPS receiver for receiving GPS satellite signals and providing GPS-derived location information and a converter for converting the interface signal to operating power signal for operating the GPS receiver. Optionally, the GPS receiver includes a power controller for controlling a duty cycle of the operating power in the GPS receiver in order to not exceed the power available from the interface signal. The interface signal is transmitted according to an interface standard such as RS232, RS422, or PC parallel.

26 Claims, 4 Drawing Sheets

RS 232 PIN ASSIGNMENTS

| INTERFACE SIGNAL | DESCRIPTION | PIN NO. 25-PIN | PIN NO. 9-PIN |
|---|---|---|---|
| TX | TRANSMIT DATA, DATA FROM DTE TO DCE | 2 | 3 |
| RX | RECEIVE DATA, DATA FROM DCE TO DTE | 3 | 2 |
| RTS | REQUEST TO SEND FROM DCE TO DTE | 4 | 7 |
| CTS | CLEAR TO SEND FROM DCE TO DTE | 5 | 8 |
| DCR | DATA COMMUNICATION READY FROM DCE TO DTE | 6 | 6 |
| GROUND | SIGNAL GROUND REFERENCE | 7 | 5 |
| DCD | DATA CARRIER DETECT FROM DTE TO DCE | 8 | 1 |
| DTR | DATA TERMINAL READY FROM DTE TO DCE | 20 | 4 |
| RI | RING INDICATOR FROM DCE TO DTE | 22 | 9 |

Fig. 2A

RS 422 PIN ASSIGNMENTS

| INTERFACE SIGNAL | DESCRIPTION | PIN NO. |
|---|---|---|
| TX- | TRANSMIT INVERTED DATA, DATA FROM DTE TO DCE | 3 |
| RX- | RECEIVE INVERTED DATA, DATA FROM DCE TO DTE | 2 |
| RTS | REQUEST TO SEND FROM DCE TO DTE | 7 |
| CTS | CLEAR TO SEND FROM DCE TO DTE | 8 |
| DCR | DATA COMMUNICATION READY FROM DCE TO DTE | 6 |
| GROUND | SIGNAL GROUND REFERENCE | 5 |
| DCD | DATA CARRIER DETECT FROM DTE TO DCE | 1 |
| TX+ | TRANSMIT NONINVERTED DATA, DATA FROM DTE TO DCE | 4 |
| RX+ | RECEIVE NONINVERTED DATA, DATA FROM DCE TO DTE | 9 |

Fig. 2B

PC PARALLEL PIN ASSIGNMENTS

| 25 PIN CONNECTOR PIN NO. | INTERFACE SIGNAL |
|---|---|
| 1 | STROBE |
| 2 | DATA BIT 0 |
| 3 | DATA BIT 1 |
| 4 | DATA BIT 2 |
| 5 | DATA BIT 3 |
| 6 | DATA BIT 4 |
| 7 | DATA BIT 5 |
| 8 | DATA BIT 6 |
| 9 | DATA BIT 7 |
| 10 | ACKNOWLEDGE |
| 11 | BUSY |
| 12 | PAPER END (OUT OF PAPER) |
| 13 | SELECT |
| 14 | AUTO FEED |
| 15 | ERROR |
| 16 | INITIALIZE PRINTER |
| 17 | SELECT INPUT |
| 18 | GROUND |
| 19 | GROUND |
| 20 | GROUND |
| 21 | GROUND |
| 22 | GROUND |
| 23 | GROUND |
| 24 | GROUND |
| 25 | GROUND |

Fig. 2C

GPS RECEIVER POWERED BY INTERFACE SIGNALS

This application is a continuation of application Ser. No. 08/521,400, filed Aug. 30, 1995, now abandoned.

BACKGROUND OF THE INVENTION

1. Field of the Invention

The invention relates generally to GPS receivers and more particularly to a GPS receiver that receives operating power from an interface signal.

2. Description of the Prior Art

A Global Positioning System (GPS) receiver is commonly used in combination with a computing apparatus. The GPS receiver receives a GPS satellite signal from one or more GPS satellites and provides a GPS-derived location as data in an interface signal. The computing apparatus receives the interface signal and processes the location information for a particular application. Typically, the computing apparatus adds control information to the interface signal to control the GPS receiver. The voltage and current levels and the pin assignments for the control and data of the interface signal are defined by an interface standard. Several interface standards exist, such as RS232; RS422; personal computer (PC) parallel, also known as Centronics printer; PCMCIA; and PC104. Both the GPS receiver and the computing apparatus must receive and/or transmit according the same interface standard in order to connect and communicate with each other.

GPS receivers receive operating power from an AC power line, an internal battery, an external DC source, or a power signal specified in the interface standard that is used. Each of these approaches has limitations. The use of the AC power line requires a relatively expensive AC power supply to convert the AC line voltage to an operating voltage. An internal battery is also relatively expensive and eventually requires replacement or recharging. An external DC source is even more expensive and requires a separate cable and/or housing. Some interface standards, including PCMCIA and PC104, provide a power signal that may be used to operate the GPS receiver. However, RS232, RS422, and PC parallel make no such provision. Unfortunately, RS232, RS422, and PC parallel are the standards that are most commonly found in the types of computing apparatus that are currently available.

Thus, there is a need for a GPS receiver having a capability to connect and communicate to a computing apparatus with RS232, RS422, and PC parallel without the requirement for an AC power supply, an internal battery, a separate DC power source, or an interface standard power signal to supply operating power.

SUMMARY OF THE INVENTION

It is therefore an object of the present invention to provide a Global Positioning lo System (GPS) receiving apparatus that is powered by a control and/or data interface signal.

Another object is to provide a GPS receiving apparatus that is powered through an RS232 interface.

Another object is to provide a GPS receiving apparatus that is powered through an RS422 interface.

Another object is to provide a GPS receiving apparatus that is powered through a PC parallel interface.

Briefly, a preferred embodiment of the GPS receiving apparatus of the present invention includes a GPS receiver for receiving GPS satellite signals and providing GPS-derived location information and a converter for converting power received from a control and/or data interface signal into operating power for the GPS receiver. Optionally, the GPS receiver includes a power controller for controlling a duty cycle of the operating power in the GPS receiver in order to not exceed the power available in the interface signal.

An advantage of the present invention is that the GPS receiving apparatus does not require an AC power supply, an internal battery, a separate DC power source, or an interface power signal for operating power.

Another advantage is that the GPS receiving apparatus receives operating power through the RS232 interface signal.

Another advantage is that the GPS receiving apparatus receives operating power through the RS422 interface signal.

Another advantage is that the GPS receiving apparatus receives operating power through the PC parallel interface signal.

These and other objects and advantages of the present invention will no doubt become obvious to those of ordinary skill in the art after having read the following detailed description of the preferred embodiments which are illustrated in the various figures.

IN THE DRAWINGS

FIG. 2a is a table for the interface signal of FIG. 1 using an RS232 interface standard;

FIG. 2b is a table for the interface signal of FIG. 1 using an RS422 interface standard;

FIG. 2c is a table for the interface signal of FIG. 1 using a PC parallel interface standard.

DETAILED DESCRIPTION OF THE PREFERRED EMBODIMENTS

Figure 1:
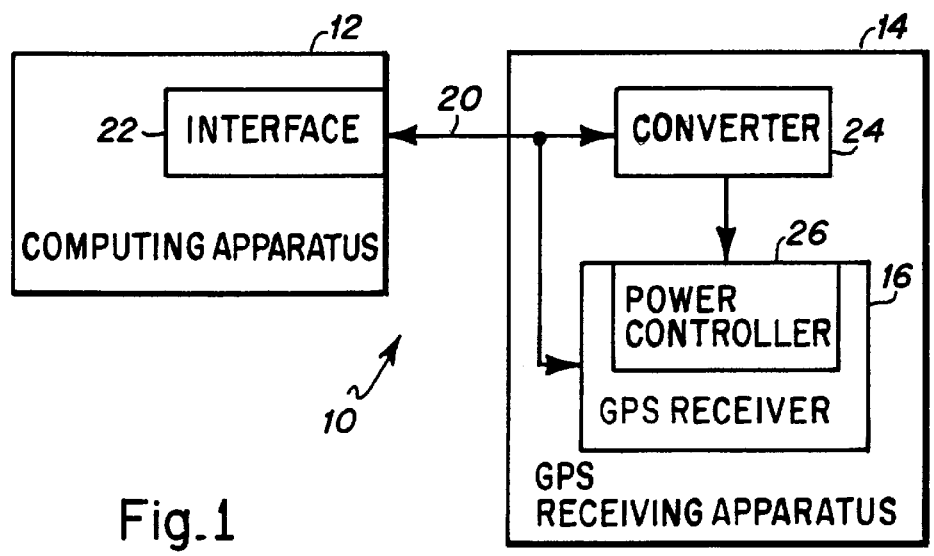
FIG. 1 is a block diagram of a GPS receiving system having a GPS receiver of the present invention, where the GPS receiver is powered by an interface signal.

FIG. 1 illustrates a block diagram of a Global Positioning System (GPS) receiving system of the present invention referred to herein by the general reference number 10. The receiving system 10 includes a computing apparatus 12 and a GPS receiving apparatus 14. The GPS receiving apparatus 14 includes a GPS receiver 16 for receiving GPS satellite signals from one or more GPS satellites and calculating GPS-derived location information for a geographical location and velocity for the GPS receiver 16 and a time of observation. The GPS receiver 16 issues a data communications equipment (DCE) interface signal, including the GPS-derived location information, through an interface cable 20 to the computing apparatus 12. The computing apparatus 12 includes an interface 22 for receiving the DCE interface signal. Typically, the computer apparatus 12 includes a processor, a clock, a memory, and variable data and pre-coded instructions stored in the memory for processing the GPS-derived location information for compiling or sorting a geographical database; calculating navigation information such as a range, a bearing, or an estimated time of arrival from the location of the GPS receiver 16 to another location or a distance made good or a velocity made good by the GPS receiver 16 from an earlier location to another location; or timing an event.

Figure 3:
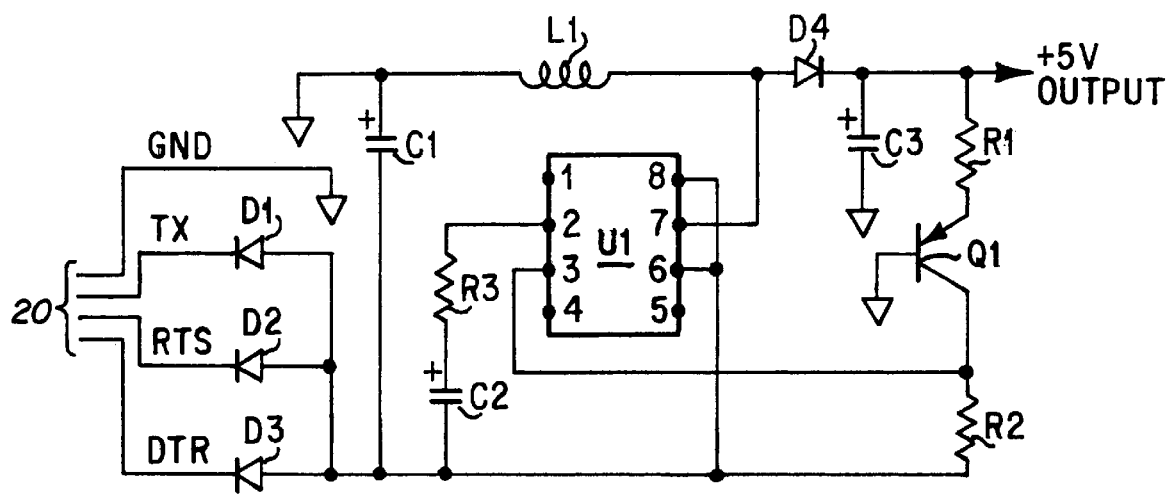
FIG. 3 is a schematic of a circuit for converting the interface signal of FIG. 1 in the interface standard of FIG. 2a into operating power for the GPS receiver of FIG. 1.

The computing apparatus 12 issues a data terminal equipment (DTE) interface signal through the interface 22 and the interface cable 20 to the GPS receiver 16 and to a converter 24. One or more signal components of the DTE interface signal are programmed by the computing apparatus 12 to a logic level to have a certain voltage. The converter 24 converts that voltage to an operating voltage and passes the operating voltage to the GPS receiver 16. Depending upon the power that is available in the DTE interface signal component and the operating power that is required, the GPS receiving apparatus 14 may include an optional power controller 26 to limit the operating duty cycle of the GPS receiver 16 so that the average operating power does not exceed the available power. The converter 24 is a switching type of power supply with a power conversion efficiency in a range of seventy five to ninety percent. Circuit designs for the converter 24 are well-known to electrical engineers. Several such designs are described in detail in a "1990 Linear Technology Databook" pages 5–73 to 5–84 available from Linear Technology Corporation of Milpitas, Calif. An exemplary circuit design is illustrated in FIG. 3. Interface standards for the interface signal are illustrated in FIG. 2a for RS232;

FIG. 2b for RS422; and FIG. 2c for PC parallel, also known as Centronics printer.

In a preferred embodiment, the GPS receiver 16 uses an operating power in a range of one to two watts at an operating voltage of plus five volts and has a hot start acquisition time in a range of a few seconds to a minute. Hot start acquisition time refers to the length of time that is required from the time when the operating power is turned on to the time when the GPS receiver 16 provides new GPS-derived location information with the following conditions: (i) current (e.g. not more than one or two hours old) GPS ephemeris information is stored in the GPS receiver 16, (ii) the reference frequency within the GPS receiver 16 has not changed more than about five hundred Hertz, and (iii) the velocity of the GPS receiver 16 has not changed more than about two hundred miles per hour. For best results, the source that provides the reference frequency in the GPS receiver 16 should be temperature compensated or protected from changes in temperature that occur during the time that the operating power is off. The power controller 26 receives a flow of operating power from the converter 24 and supplies bursts of operating power so that the GPS receiver 16 alternates between an on time for a hot start acquisition of the GPS satellite signals and the derivation of the GPS location and an off time. The duty cycle of the bursts is controlled by the power controller 26 so that the average operating power does not exceed the power that is available from the DTE interface signal. Of course, as lower power GPS receivers are developed, the duty cycle may be increased until eventually the power controller 26 may be eliminated. The GPS receiver 16 is available from several manufacturers including an "SVeeThree" series or "SVeeSix" series from Trimble Navigation Ltd of Sunnyvale, Calif., an "ONCORE" from Motorola Inc of Shaumberg, Ill., and a "MicroTracker" from Rockwell International Inc of Newport Beach, Calif.

In another preferred embodiment, the GPS receiver 16 includes an internal capability to alternate between a normal operational mode to acquire the GPS satellite signals and provide the GPS-derived location information and a low power standby mode. Such GPS receiver 16 is described in U.S. Pat. No. 05,592,173 "GPS RECEIVER HAVING A LOW POWER STANDBY MODE" by Lau at al. and U.S. Pat. No. 5,594,453 "GPS RECEIVER HAVING RAPID ACQUISITION OF GPS SATELLITE SIGNALS", by Rodal et al. both of which are assigned to the same assignee as the present application and are incorporated herein by reference. The low power standby mode is obtained by inhibiting the operating power off to certain of the RF and analog circuits and/or inhibiting the operating clock signal to certain of the digital circuits in the GPS receiver 16. A reference frequency oscillator, a timer, and a real time clock continue to receive clock signals in order to provide a reference frequency and time for re-acquiring the GPS satellite signals and to reawaken the GPS receiver 16 to re-enter the normal mode. The acquisition time is reduced by correcting the reference frequency and/or time drift that occurs during a standby mode either based upon frequency drift history or by measuring temperature before and after the standby mode and compensating for the effect of the change in temperature upon the frequency.

FIG. 2a lists pin assignments for the connections of the interface cable 20 for an RS232 interface standard. The connections are available as a twenty-five pin version and a nine pin version. The RS232 interface standard is described in a document entitled "EIA Standard, Interface Between Date Terminal Equipment and Data Circuit-Terminating Equipment Employing Serial Binary Interchange, EIA-232-D", published in January, 1987 by the Engineering Department of the Electronic Industries Association in Washington, District of Columbia and in a document entitled "EIA-232 Interface Circuits Application and Data Book 1991", pages 2–3 to 2–8, available from Texas Instruments in most cities.

Several integrated circuits for receiving and issuing interface signals according to the RS232 interface standard for use in the GPS receiver 16 and the interface 22 are described in the "MAXIM 1995 New Releases Data Book" pages 2–23 to 2–40 published by MAXIM Integrated Products, Inc. in Sunnyvale, Calif. and are commercially available from MAM. In FIG. 2a, the computing apparatus 12 is represented by DTE and the GPS receiving apparatus 14 is represented by DCE. To supply operating power to the GPS receiver 16, the computing apparatus 12 programs transmit data (TX), request to send (RTS), and data terminal ready (DTR) signal components of the DTE interface signal to a logic 1 level thereby setting these signal components to a voltage level of typically minus eight volts. Alternatively, the computing apparatus 12 programs the TX, RTS, and DTR to a logic level 0 thereby setting the signal components to a voltage level of typically plus eight volts. Receive data (RX) is used to transmit the GPS-derived location information from the GPS receiver 16 to the computing apparatus 12. Clear to Send (CTS), Data Communications Ready (DCR), and Data Carrier Detect (DCD) are not required. A typical RS232 interface 22 can sink enough current at minus eight volts or source enough current at plus eight volts to supply a power of about fifty milliwatts for each of the TX, RTS, and DTR for a total DTE interface signal power of about one hundred fifty milliwatts. The converter 24 converts the DTE interface signal power to an output power in a range of about one hundred twelve to one hundred thirty five milliwatts at a voltage of plus five volts for operating the GPS receiver 16.

FIG. 2b lists pin assignments for connections of the interface cable 20 for an RS422 interface standard. The RS422 interface standard is described in a document entitled "EIA-422-A, Electrical Characteristics of Balanced Voltage Digital Interface Circuits" published by the Electronic Industries Association in Washington, District of Columbia. Several integrated circuits for issuing and receiving interface signals according to the RS422 interface standard are described in the "MAXIM 1995 New Releases Data Book" pages 2–160 to 2–174 available from MAXIM Integrated Products, Inc. and are commercially available from MAXIM. The RS422 interface standard is flexible as to which pins are assigned to which signal components. The FIG. 2b shows the pins as used in the present invention. To supply operating power to the GPS receiver 16, the computing apparatus 12 programs transmit inverted data (TX–) and request to send (RTS) signal components of the DTE interface signal to a logic 1 level thereby setting the voltages of these signal components to a level of plus two or more volts. Alternatively, the computing apparatus may program transmit noninverted data (TX+) and request to send (RTS) to a logic 1 level. At two volts, the interface 22 can supply a current of forty milliamps from each of RTS and TX– or TX+ for a total DTE interface signal power of about one hundred sixty milliwatts. The converter 24 converts the DTE interface signal power to an output power in a range of about one hundred twenty to one hundred fortyfour milliwatts for operating the GPS receiver 16.

FIG. 2c lists pin assignments for connections for the interface cable 20 for the PC parallel, also known as Centronics printer, interface standard. The PC parallel interface standard is described on pages 644 to 664 in "The Winn L. Rosch Hardware Bible, Third Edition" by Winn L. Rosch, published in 1994 ISBN I-56686-127-6 by Sams Publishing, Indianapolis, Ind. Standard 74 series circuits such as model no. "MM74HC373" octal D-type latch and "MM74HC374" octal D-type flip-flop may be used for issuing the interface signal according to the PC parallel interface standard. Such circuits are commercially available from National Semiconductor Inc. in most major cities. Several custom integrated circuits are also available. To supply operating power to the GPS receiver 16, the computing apparatus 12 programs the DTE interface signal components high or to a logic 1 for strobe, data bit 0, data bit 1, data bit 2, data bit 3, data bit 4, data bit 5, data bit 6, data bit 7, auto feed, initialize printer, and select input, thereby setting these signal components to nominally plus five volts. In a typical PC parallel interface 22, each of the twelve control and data signals can source at least 2.6 milliamps at nominally five volts for a power of one hundred fifty six milliwatts. DCE interface control signals for acknowledge, busy, paper end, select, and error are not required or may be used to send the GPS-derived location information from the GPS receiver 16 to the computing apparatus 12. The converter 24 converts the DTE interface signal power to an output power in a range of about one hundred twelve to one hundred thirty five milliwatts at a voltage of about plus five volts for operating the GPS receiver 16. Where the control and data signal voltages are between +4.5 and +5.5 volts, the converter 24 may be eliminated.

FIG. 3 illustrates a circuit for the converter 24 for converting an input of about minus eight volts from the DTE interface signal components of TX, RTS, and DTR according to the RS232 interface standard to an output voltage of plus five volts. The output voltage supplies the operating power for the GPS receiver 16. Schottky diodes D1, D2, D3, and D4 are model "MBRS1730T3" available from Motorola Inc. Regulator integrated circuit U1 is a model "LT1172" available from Linear Technology Inc of Milpitas, Calif. Regulator U1 pin numbers one to eight show the connection of U1 into the circuit. Electrolytic capacitors C1, C2, and C3 are constructed of Tantalum. Capacitor C1 is about 15 uF, capacitor C2 is about 1 uF, and capacitor C3 is about 100 uF. The "+" signs adjacent to the capacitors C1, C2, and C3 show the polarity of the connections into the circuit. Transistor Q1 is a PNP type of model "MMBT5087" available from Motorola. Resistors R1, R2, and R3 are constructed of metal film. Resistor R1 is about 43.4 kOhms, resistor R2 is about 12.4 kOhms, and resistor R3 is about 1 kOhms. Inductor L1, available from, Coiltronics Inc. of Pompano Beach, Fla., is about 1.5 milliHenrys and has a low series resistance and high saturation current.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A Global Positioning System (GPS) receiving apparatus including:
   a converter for receiving a logic interface signal having logic levels of 1 and 0 for at least one of (i) data and (ii) control information and converting energy in said interface signal into operating power; and
   a GPS receiver connected to the converter for using said operating power for receiving GPS satellite signals and providing GPS-derived location information.

2. The apparatus of claim 1, wherein:
   the GPS receiver includes a power controller for controlling a duty cycle of said operating power in the GPS receiver.

3. The apparatus of claim 1, wherein:
   the GPS receiver includes a normal operational mode for processing the GPS satellite signals and for provided the GPS-derived location and a low power standby mode wherein the GPS receiver has a lower power consumption than in said normal operational mode.

4. The apparatus of claim 3, wherein:
   the GPS receiver further includes means for alternating between said normal operational mode and said low power standby mode.

5. The apparatus of claim 3, wherein:
   the GPS receiver further includes means for inhibiting an operating clock signal during said standby mode.

6. The apparatus of claim 1, wherein:
   the converter is further for receiving said interface signal transmitted according to an RS232 interface standard.

7. The apparatus of claim 6, wherein:
   the converter is further for converting said energy in said interface signal for at least one of (i) TX, (ii) RTS, and (iii) DTR into said operating power.

8. The apparatus of claim 1, wherein:
   the converter is further for receiving said interface signal transmitted according to an RS422 interface standard.

9. The apparatus of claim 8, wherein:
   the converter is further for converting said energy in said interface signal for at least one of (i) TX+, (ii) TX–, and (iii) RTS into said operating power.

10. The apparatus of claim 1, wherein:
    the converter is further for receiving said interface signal transmitted according to a PC parallel interface standard.

11. The apparatus of claim 10, wherein:
    the converter is further for converting said energy in said interface signal for at least one of (i) strobe, (ii) data bit 0, (iii) data bit 1, (iv) data bit 2, (v) data bit 3, (vi) data bit 4, (vii) data bit 5, (viii) data bit 6, (ix) data bit 7, (x) auto feed, (xi) initialize printer, and (xii) select printer into said operating power.

12. A Global Positioning System (GPS) receiving system including:

a converter for receiving a logic interface signal having logic levels of 1 and 0 for at least one of (i) data and (ii) control information and converting energy in said interface signal into operating power;

a GPS receiver for using said operating power for receiving GPS satellite signals and providing GPS-derived location information; and a computing apparatus for providing said interface signal.

13. The system of claim 12, wherein:

the computing apparatus includes means for receiving said GPS-derived location information from the GPS receiver; and means for compiling a geographical database based upon said GPS-derived location information.

14. The system of claim 12, wherein:

the computing apparatus further includes means for sorting a geographical database using said GPS-derived location information.

15. The system of claim 12, wherein:

the GPS receiver is further for providing said GPS-derived location information including a geographical location of the GPS receiver; and the computing apparatus further includes means for receiving said GPS-derived location information from the GPS receiver; and means for calculating at least one of (i) a range from said geographical location to another location, (ii) a bearing from said geographical location to another location, (iii) an estimated time of arrival from said geographical location to another location (iv) a distance made good by the GPS receiver from an earlier geographical location of the GPS receiver to another location, and (v) a velocity made good by the GPS receiver from an earlier geographical location of the GPS receiver to another location.

16. The system of claim 12, wherein:

the GPS receiver is further for providing said GPS-derived location information including a time of observation; and the computing apparatus further includes means for receiving said GPS-derived location information from the GPS receiver; and means for timing an event based upon said GPS-derived location information.

17. The system of claim 12, wherein:

the GPS receiver includes a power controller for controlling a duty cycle of said operating power in the GPS receiver.

18. The system of claim 12, wherein:

the GPS receiver includes a normal operational mode for processing the GPS satellite signals and for provided the GPS-derived location and a low power standby mode wherein the GPS receiver has a lower power consumption than in said normal operational mode.

19. The system of claim 18, wherein:

the GPS receiver further includes means for alternating between said normal operational mode and said low power standby mode.

20. The system of claim 18, wherein:

the GPS receiver further includes means for inhibiting an operating clock signal during said standby mode.

21. The system of claim 12, wherein:

the converter is further for receiving said interface signal transmitted according to an RS232 interface standard.

22. The system of claim 12, wherein:

the converter is further for converting said energy in said interface signal for at least one of (i) TX, (ii) RTS, and (iii) DTR into said operating power.

23. The system of claim 12, wherein:

the converter is further for receiving said interface signal transmitted according to an RS422 interface standard.

24. The system of claim 23, wherein:

the converter is further for converting said energy in said interface signal for at least one of (i) TX+, (ii) TX−, and (iii) RTS into said operating power.

25. The system of claim 12, wherein:

the converter is further for receiving said interface signal transmitted according to a PC parallel interface standard.

26. (once amended) The system of claim 25, wherein:

the converter is further for converting said energy in said interface signal for at least one of (i) strobe, (ii) data bit 0, (iii) data bit 1, (iv) data bit 2, (v) data bit 3, (vi) data bit 4, (vii) data bit 5, (viii) data bit 6, (ix) data bit 7, (x) auto feed, (xi) initialize printer, and (xii) select printer into said operating power.

* * * * *

UNITED STATES PATENT AND TRADEMARK OFFICE
CERTIFICATE OF CORRECTION

PATENT NO. : 5,848,376
DATED : Dec. 8, 1998
INVENTOR(S) : Glenn C. Steiner & Lloyd H. Banta It is certified that error appears in the above-identified patent and that said Letters Patent is hereby corrected as shown below:

In column 6, line 34, change "provided" to --providing--;
In column 6, line 35, after "location" insert --information--;
In column 8, line 9, change "provided" to --providing--; and
In column 8, line 10, after "location" insert --information--.

Signed and Sealed this

Twenty-fifth Day of May, 1999

Attest:

Q. TODD DICKINSON

*Attesting Officer*    Acting Commissioner of Patents and Trademarks